United States Patent
Lee et al.

(10) Patent No.: US 9,634,949 B2
(45) Date of Patent: Apr. 25, 2017

(54) METHOD AND APPARATUS FOR SUPPORTING LARGE SERVICE DATA UNIT IN MOBILE COMMUNICATION SYSTEM

(71) Applicant: Samsung Electronics Co., Ltd., Gyeonggi-do (KR)

(72) Inventors: Jun-Sung Lee, Gyeonggi-do (KR); Hyeong-Seok Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 89 days.

(21) Appl. No.: 14/640,707

(22) Filed: Mar. 6, 2015

(65) Prior Publication Data

US 2015/0256472 A1 Sep. 10, 2015

Related U.S. Application Data

(60) Provisional application No. 61/948,876, filed on Mar. 6, 2014.

(30) Foreign Application Priority Data

Sep. 11, 2014 (KR) .......................... 10-2014-0120179

(51) Int. Cl.
| | |
|---|---|
| *H04W 80/04* | (2009.01) |
| *H04W 28/06* | (2009.01) |
| *H04L 12/805* | (2013.01) |
| *H04L 12/801* | (2013.01) |

(52) U.S. Cl.
CPC .......... *H04L 47/365* (2013.01); *H04L 47/196* (2013.01)

(58) Field of Classification Search
CPC ... H04W 47/36; H04W 80/04; H04W 28/065; H04W 28/06; H04L 47/36; H04L 47/365; H04L 47/196; H04L 47/10
See application file for complete search history.

(56) References Cited

U.S. PATENT DOCUMENTS

| | | | |
|---|---|---|---|
| 2007/0060139 A1* | 3/2007 | Kim ..................... | H04L 1/1841 455/445 |
| 2008/0137601 A1* | 6/2008 | Sung .................... | H04W 28/065 370/329 |
| 2008/0186946 A1* | 8/2008 | Marinier ................ | H04L 49/90 370/349 |
| 2009/0103512 A1* | 4/2009 | Chun .................... | H04L 1/1685 370/346 |
| 2009/0259908 A1* | 10/2009 | Gollapudi ............. | H04L 1/0079 714/748 |
| 2010/0135212 A1* | 6/2010 | Ho ...................... | H04W 28/065 370/328 |

(Continued)

*Primary Examiner* — Andrew Lee
(74) *Attorney, Agent, or Firm* — The Farrell Law Firm, P.C.

(57) ABSTRACT

A method and apparatus are provided for supporting a large Service Data Unit (SDU) in a receiver of a mobile communication system. The method includes receiving a Radio Link Control (RLC) Protocol Data Unit (PDU) from an upper layer; checking a Length Indicator (LI) included in an RLC header of the RLC PDU; if the LI is configured as "0", determining that the received RLC PDU includes an RLC SDU of 2047 bytes, and if the LI is configured as a value other than "0", determining that the received RLC PDU includes an RLC SDU of a size corresponding to the value of the LI; and reforming the RLC SDU, based on the LI.

22 Claims, 10 Drawing Sheets

(56) References Cited

U.S. PATENT DOCUMENTS

| | | | |
|---|---|---|---|
| 2012/0137601 A1* | 6/2012 | Peelman | E04H 4/10 52/173.3 |
| 2013/0039273 A1* | 2/2013 | Lee | H04L 47/36 370/328 |
| 2013/0044698 A1* | 2/2013 | Susitaival | H04W 28/06 370/329 |

* cited by examiner

METHOD AND APPARATUS FOR SUPPORTING LARGE SERVICE DATA UNIT IN MOBILE COMMUNICATION SYSTEM

PRIORITY

This application claims priority under 35 U.S.C. §119 to U.S. Provisional Patent Application Ser. No. 61/948,876, which was filed in the U.S. Patent and Trademark Office on Mar. 6, 2014, and to Korean Application Serial No. 10-2014-0120179, which was filed in the Korean Intellectual Property Office on Sep. 11, 2014, the entire content of each of which is hereby incorporated by reference.

BACKGROUND OF THE INVENTION

1. Field of the Invention

The present invention relates generally to a method and an apparatus for supporting a large Service Data Unit (SDU) in a mobile communication system.

2. Description of the Related Art

General wireless communication systems (or networks) provide access to multiple users with respect to at least one shared resource (e.g., bandwidth, transmission power, etc.). For example, the systems adopt various multiple access technologies, such as Frequency Division Multiplexing (FDM), Time Division Multiplexing (TDM), Code Division Multiplexing (CDM), Orthogonal Frequency Division Multiplexing (OFDM), a 3GPP Long Term Evolution (LTE) system, etc.

The protocol stack of the Long Term Evolution (LTE) system using OFDM generally includes three parts, i.e., a Medium Access Control (MAC) layer, a Radio Link Control (RLC) layer, and a Packet Data Convergence Protocol (PDCP).

Most current computer systems are based on a Maximum Transfer Unit (MTU) of 1500 bytes. Accordingly, a maximum length of one RLC SDU is configured to have an 11 bit-length, i.e., 2047 bytes in the LTE system. Therefore, in order to transmit a large amount of data, e.g., more than 2047 bytes, fragmentation is performed in the upper layer, i.e., an Internet Protocol (IP) layer, of the LTE system.

Currently, most of the MTUs of the LTE upper systems are configured to 1500 bytes, which is not always problematic. However, the LTE protocol stack will still need to be taken into consideration in order to support an upper system configured with an MTU having a size that exceeds 1500 bytes, e.g., 2047 bytes, in the future.

SUMMARY OF THE INVENTION

The present invention is designed to address at least the problems and/or disadvantages described above and to provide at least the advantages described below.

Accordingly, an aspect of the present invention is to provide a method and an apparatus for supporting a large SDU in a mobile communication system.

Another aspect of the present invention is to provide a method and an apparatus for scheduling and implementing formation of an RLC Protocol Data Unit (PDU).

In accordance with an aspect of the present invention, a method is provided for supporting a large SDU in a receiver of a mobile communication system. The method includes receiving a Radio Link Control (RLC) Protocol Data Unit (PDU) from an upper layer; checking a Length Indicator (LI) included in an RLC header of the RLC PDU; if the LI is configured as "0", determining that the received RLC PDU includes an RLC SDU of 2047 bytes, and if the LI is configured as a value other than "0", determining that the received RLC PDU includes an RLC SDU of a size corresponding to the value of the LI; and reforming the RLC SDU, based on the LI.

In accordance with another aspect of the present invention, a method is provided for supporting a large SDU in a transmitter of a mobile communication system. The method includes determining whether a size of a Radio Link Control (RLC) SDU to be transmitted exceeds 2047 bytes; if the size of the RLC SDU exceeds 2047 bytes, segmenting the RLC SDU by 2047 bytes; configuring a Length Indicator (LI) of the RLC SDU of 2047 bytes as "0", and configuring an LI of a remaining RLC SDU as a value corresponding to a size of the remaining RLC SDU; and transmitting an RLC Protocol Data Unit (PDU), based on the configured LIs.

In accordance with another aspect of the present invention, an apparatus is provided for supporting a large SDU in a receiver of a mobile communication system. The apparatus includes a transceiver that receives a Radio Link Control (RLC) Protocol Data Unit (PDU) from an upper layer; and a controller that checks a size of a Length Indicator (LI) included in an RLC header of the RLC PDU, determines that the received RLC PDU is an RLC SDU of 2047 bytes, if the LI is configured as "0", determines that the received RLC PDU includes an RLC SDU of a size corresponding to a value of the LI, if the LI is configured as a value other than "0", and reforms the RLC SDU, based on the LI.

In accordance with another aspect of the present invention, an apparatus is provided for supporting a large SDU in a transmitter of a mobile communication system. The apparatus includes a controller that determines whether a size of a Radio Link Control (RLC) SDU to be transmitted exceeds 2047 bytes, segments the RLC SDU by 2047 bytes, if the size of the RLC SDU exceeds 2047 bytes, configures a Length Indicator (LI) of the RLC SDU of 2047 bytes as "0", and configures an LI of a remaining RLC SDU as a value corresponding to a size of the remaining RLC SDU; and a transceiver that transmits an RLC Protocol Data Unit (PDU), based on the configured LIs.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
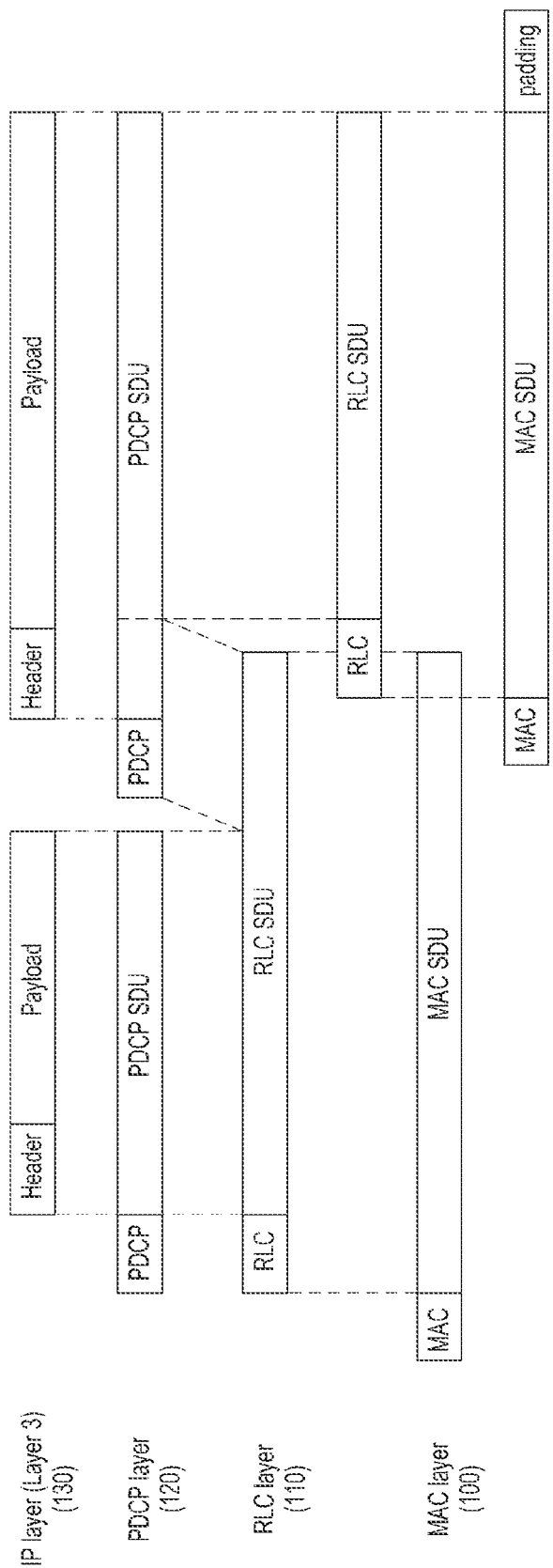
FIG. 1 illustrates a protocol stack of an LTE system.

Hereinafter, various embodiments of the present invention will be described with reference to the accompanying drawings, in which the same elements will be designated by the same reference numerals although they are shown in different drawings. Further, detailed descriptions of known functions and configurations, which may obscure the subject matter of the present invention, will be omitted.

Further, terms or words used in the description and claims below should not be interpreted as only general or dictionary meanings, but interpreted as meanings and concepts satisfying the technical spirit of the present disclosure based on a principle in which the disclosure may be appropriately defined his/her disclosure with a concept of the terms in order to describe the various embodiments of the invention.

Hereinafter, a base station may be simplified in a two-node structure, such as an Evolved Node B (referred to as "ENB" or "Node B" hereinafter) and an anchor node. Hereinafter, a terminal refers to a User Equipment (UE)

FIG. 1 illustrates a protocol stack of an LTE system.

Referring to FIG. 1, the protocol stack includes a PHY layer (not shown), a MAC layer 100, an RLC layer 110, and a PDCP layer 120.

Specifically, FIG. 1 illustrates a transmission process of an IP packet through the PDCP layer 120, the RLC layer 110, and the MAC layer 100 of the LTE protocol stack. The PDCP layer 120 creates a PDCP PDU, e.g., through header compression (e.g., robust header compression) of Transfer Control Protocol (TCP)/User Datagram Protocol (UDP)/IP/Real-time Transport Protocol (RTP), header addition of PDCP, and ciphering, with respect to an IP packet transmitted from an IP layer 130. That is, when the size of an RLC PDU to be transmitted is given, data of the upper layer is partitioned or joined according to the size, and then the RLC PDU header is added, thereby creating the RLC PDU.

The RLC layer 110 concatenates a plurality of PDCP PDUs or segments one PDCP PDU to create the RLC PDU according to resources allotted from the MAC layer 100. In addition, the RLC layer 110 may perform re-transmission to restore packet loss.

The MAC layer 100 receives allotted wireless resources, allots the size of the RLC PDU to each logical channel, and creates the MAC PDU.

Because the size of the MTU in most of the systems is configured to 1500 bytes, the size of an IP packet does not exceed 1500 bytes. Further, because the size of the IP packet does not normally exceed 1500 bytes, the size of one PDCP PDU also does not normally exceed 1500 bytes. Since a length field, i.e., a Length Indicator (LI), of an RLC SDU has 11 bits in the current LTE RLC specification, the PDCP PDU can be expressed up to a maximum of 2047 bytes, which is not problematic for a system having an MTU of 1500 bytes.

However, when the system is changed by increasing the MTU size greater than 1500 bytes, i.e., more than 2047 bytes, the size of the PDCP PDU may also increase more than 2047 bytes as well. Further, the size of the RLC SDU increases up to more than 2047 bytes and cannot be expressed by the current LI field of 11 bits.

Figure 2:
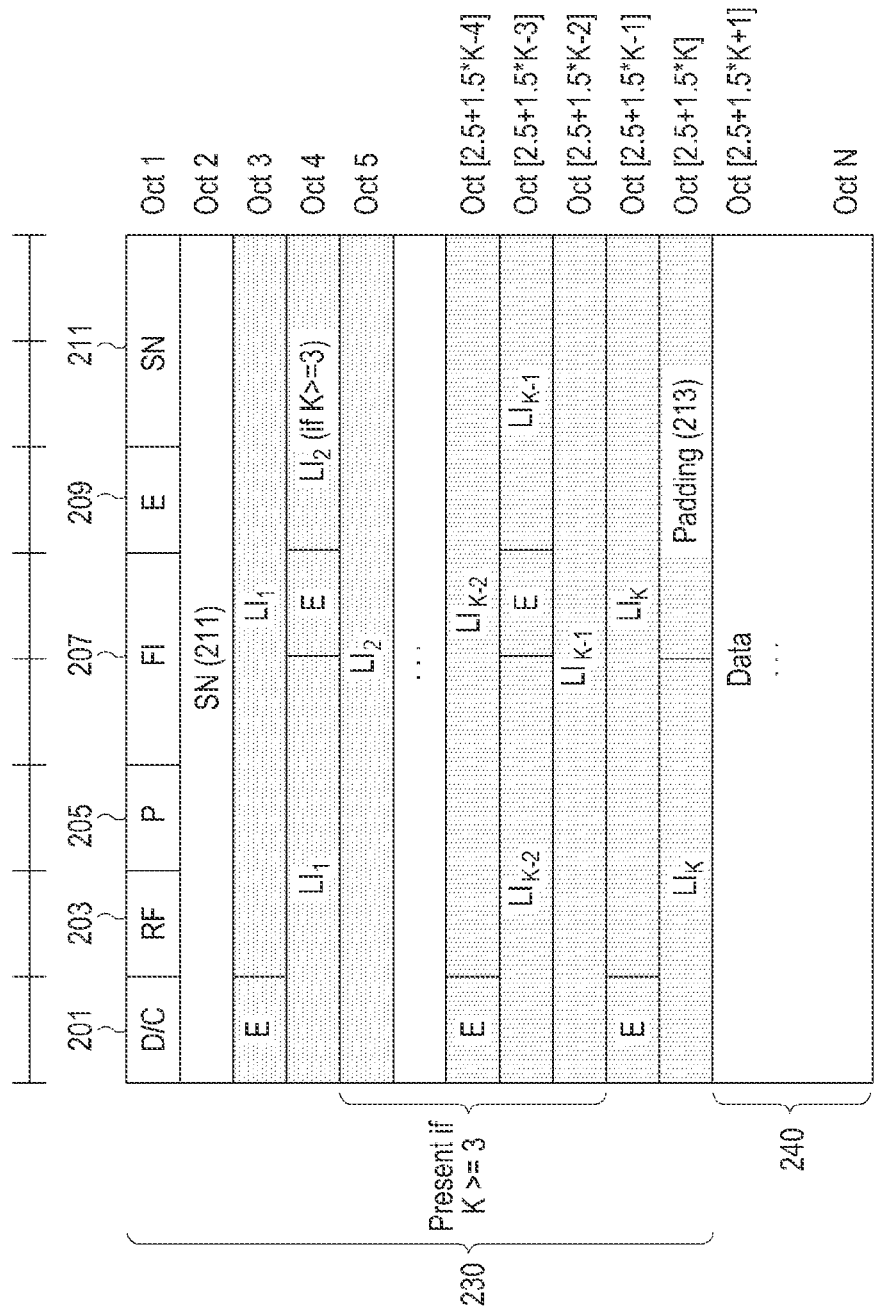
FIG. 2 illustrates an example of a packet in an LTE system.

FIG. 2 illustrates an example of a packet in an LTE system.

Referring to FIG. 2, the packet includes a header field 230 and a data field 240.

The header field 230 includes a Data/Control (D/C) field 201, a Re-segmentation Flag (RF) field 203, a Polling bit (P) field 205, a Framing Information (FI) field 207, an Extension bit (E) field 209, a Sequence Number (SN) field 211, an LI field, etc.

The D/C field 201 indicates whether the RLC PDU is an RLC data PDU or an RLC control PDU.

The RF field 203 indicates whether the RLC PDU is an AMD PDU or an AMD PDU segment.

The P field 205 indicates whether the transmission party of an AMD RLC entity requests a status report to its the peer AMD RLC entity.

The FI field 207 indicates whether the beginning of the RLC SDU corresponds to the beginning of the data field and the end of the RLC SDU corresponds to the end of the data field.

The E field 209 is a one bit field, which indicates whether the data field follows or a set of the E field and the LI field follows.

The SN field 211 indicates a sequence number of the RLC PDU.

Padding places (or fills) specific bits (normally, "0") into an extra portion of the packet in order to make the size of the packet meet the byte-alignment in creating the packet. Accordingly, the padding field 213 of FIG. 2 indicates whether the padding is used or not.

The data field 240 of FIG. 2 includes at least one data field element. The data field element includes one or more RLC SDU segments and/or one or more RLC SDUs.

The LI field indicates a byte length of a corresponding data field element that exists in the RLC data PDU received or transmitted from the RLC layer. In accordance with an embodiment of the present invention, the LI field may increase in bits in order to process the PDCP PDU (i.e., RLC SDU) having a size greater than 2047 bytes in the RLC layer. For example, the current LI field of 11 bits may increase to 13 bits or more, considering later extension.

While increasing the size of the LI fields is one of the easiest ways, specifications should still be changed. Also, even with the change of the specifications, the backward compatibility of a typical protocol and an LTE protocol stack should be considered, which creates a burden on the scheduling of the LTE system.

Figure 3:
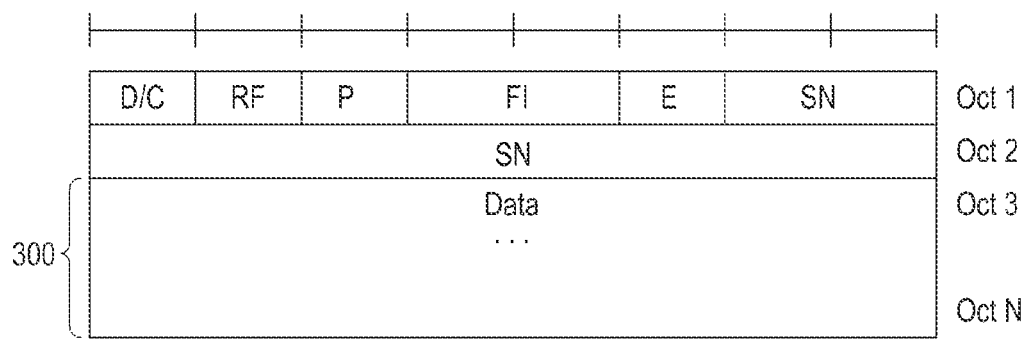
FIG. 3 illustrates another example of a packet in an LTE system.

FIG. 3 illustrates another example of a packet in an LTE system. Specifically, FIG. 3 illustrates a data field 300 without an LI field.

Referring to FIG. 3, the RLC SDU having a size greater than 2047 bytes is disposed at the end of RLC SDUs without the LI field. Generally, the LI field is not used when the RLC PDU includes a single RLC SDU. In this case, because the LI field is not used, the size of the RLC SDU may be relatively flexible.

Figure 4:
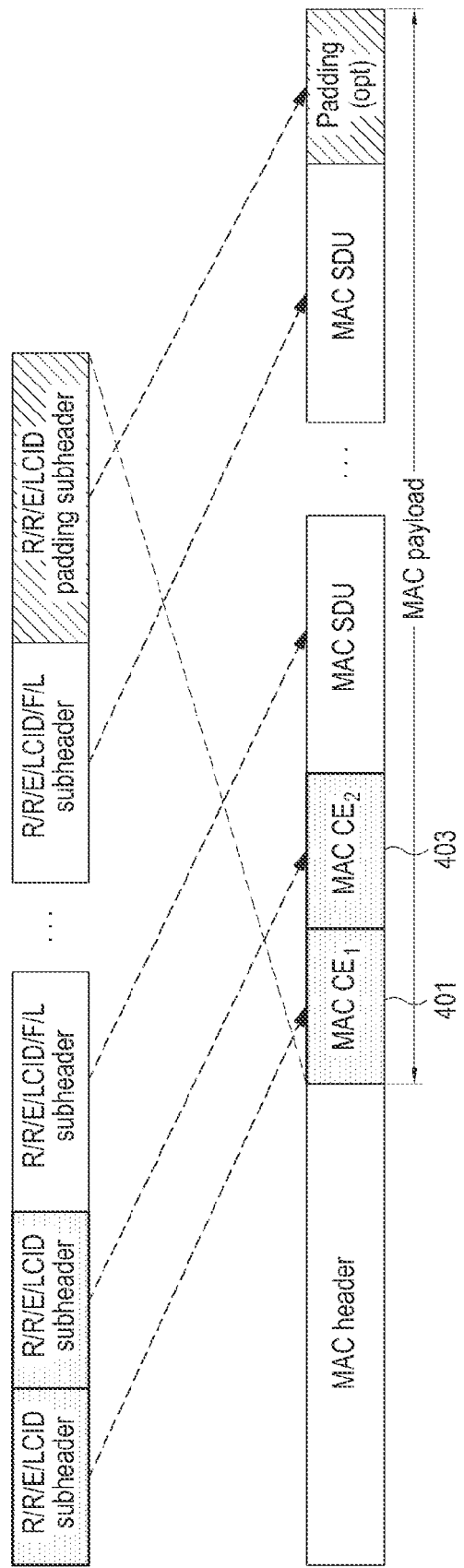
FIG. 4 illustrates a MAC PDU according to an embodiment of the present invention.

FIG. 4 illustrates a MAC PDU according to an embodiment of the present invention.

Referring to FIG. 4, when a plurality of RLC SDUs are concatenated, the RLC PDU may be formed by disposing the RLC SDU having a size greater than 2047 bytes at the end of the SDUs. In such a method, the length may be indirectly decided by using the length of the MAC PDU even without the LI field indicating the size at the end.

However, the method without the LI field increases the overhead of the MAC PDU by adding MAC sub-headers 401 and 403 (MAC Control Elements (CEs)) to the MAC header.

One MAC SDU (i.e., RLC PDU) is paired with one MAC sub-header. Accordingly, when only one RLC PDU is created with respect to each RLC SDU by not using the LI field, every single RLC PDU may adopt the MAC sub-header, which would increase the number of the MAC sub-headers.

In addition, using the method in which an RLC SDU having a size greater than 2047 bytes is disposed at the end of the SDUs has limitations because it may cause a problem in in-order delivery and is difficult to schedule.

Figure 5:
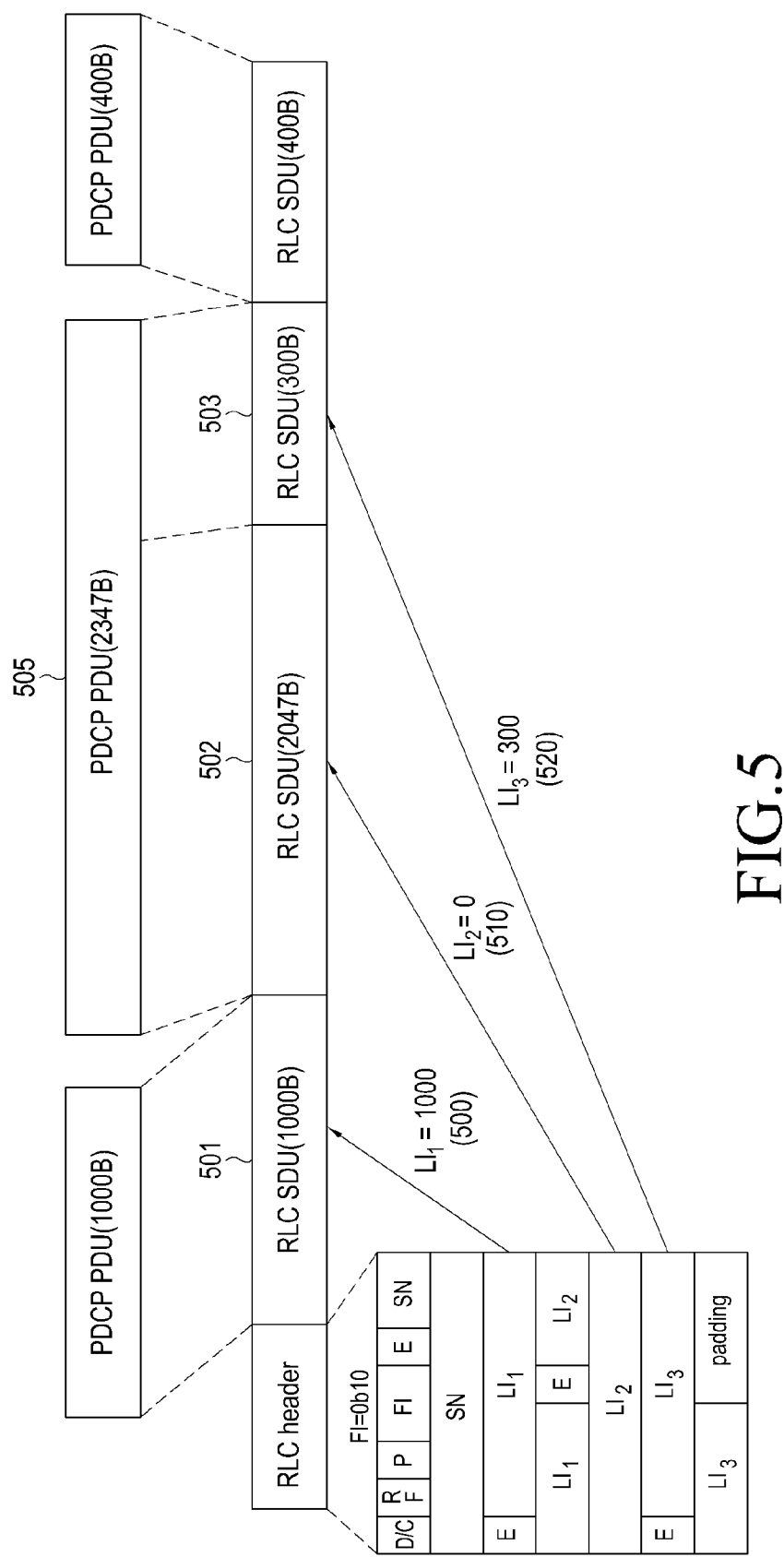
FIG. 5 illustrates a packet in an LTE system supporting a large SDU in a mobile communication system according to an embodiment of the present invention.

FIG. 5 illustrates a packet in an LTE system supporting a large SDU in a mobile communication system according to an embodiment of the present invention.

For the last RLC SDU of a plurality of RLC SDUs or a sole RLC SDU that can be transmitted, the LI field of the RLC PDU may be omitted.

In order to support a large SDU, e.g., larger than 2047 bytes, in the mobile communication system according to an embodiment of the present invention, the length of the RLC SDU may be extended by redefining the LI field value "0". That is, "0" of the LI field of the current RLC PDU is defined as "reserved". However, in accordance with an embodiment of the present invention, "0" of the LI field is defined as "2047 bytes+alpha", so the RLC SDU having a size greater than 2047 bytes can be processed. The LI field value "2047" simply means a PDCP PDU of 2047 bytes.

Specifically, FIG. 5 illustrates three RLC SDUs, and the sum of two of the RLC SDUs is 2347 bytes, which is more than 2047 bytes. Assuming that radio frequency allocation is given so that three SDUs can be transmitted, the LI value of the RLC header may be expressed as illustrated in FIG. 5.

$LI_1$ of the RLC header is expressed as "1000" ($LI_1$=1000) (500) in order to transmit the RLC SDU 501 of 1000 bytes.

$LI_2$ and $LI_3$ of the RLC header are expressed as "0" and "300", respectively, in order to transmit the PDCP PDU 505 of 2347 bytes, i.e., greater than 2047 bytes. Specifically, the RLC SDU of 2347 bytes includes the RLC SDU 502 of 2047 bytes and the RLC SDU 503 of 300 bytes. That is, the LI of the RLC SDU 502 of 2047 bytes is expressed as, for example, "0" ($LI_2$=0) (510), and the LI of the RLC SDU 503 of 300 bytes is expressed as, for example, "300" ($LI_3$=300) (520).

When the LI value 510 of the RLC SDU 502 is expressed as "0", this indicates that the size of the RLC SDU 502 is 2047 bytes, and when the LI value 520 of the RLC SDU 503 is expressed as "300", this indicates that the size of the RLC SDU 503 is 300 bytes.

As illustrated in FIG. 5, as the number N of large RLC SDUs increases, the length of the RLC header increases by N×12 bits. However, this method does not require additional signaling in the upper layer for compatibility with the typical specification, and makes it easy to schedule and implement the formation of the RLC PDU.

Figure 6:
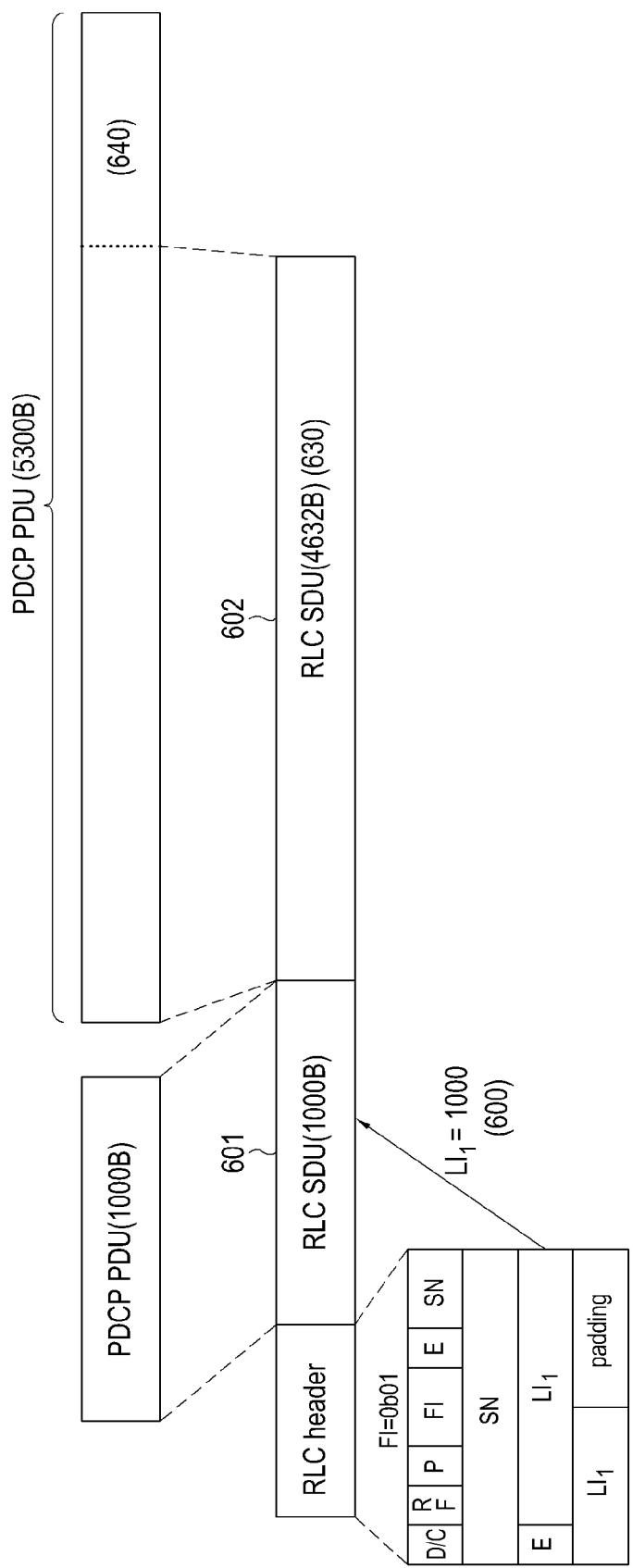
FIG. 6 illustrates a packet in an LTE system supporting a large SDU in a mobile communication system according to an embodiment of the present invention.

FIG. 6 illustrates a packet in an LTE system supporting a large SDU in a mobile communication system according to an embodiment of the present invention. Specifically, FIG. 6 illustrates an RLC SDU that has a size that varies with situations of channels or allocated resources.

Referring to FIG. 6, a PDCP PDU is fragmented due to a lack of wireless resource allocation. Reference numeral 640 denotes a PDCP PDU of 668 bytes (5300 bytes−4632 bytes) that is to be transmitted in a next Transmission Time Interval (TTI) because there are not enough wireless resources allocated to transmit the PDCP PDU in the current TTI.

In order to transmit the RLC SDU 601 of 1000 bytes, $LI_1$ of the RLC header is expressed as "1000" ($LI_1$=1000) (600).

Although the PDCP PDUs of 1000 bytes and 5300 bytes queue, only the RLC SDU 601 of 1000 bytes and the RLC SDU 602 of 4632 bytes are transmitted due to a lack of wireless resource allocation. Because the fragmented RLC SDU 602 of 4632 bytes is the last SDU of the RLC PDU, it does not need the additional LI field illustrated in FIG. 5. However, the FI field of the RLC header is configured as "0b01" to indicate that the RLC SDU has been fragmented.

Figure 7:
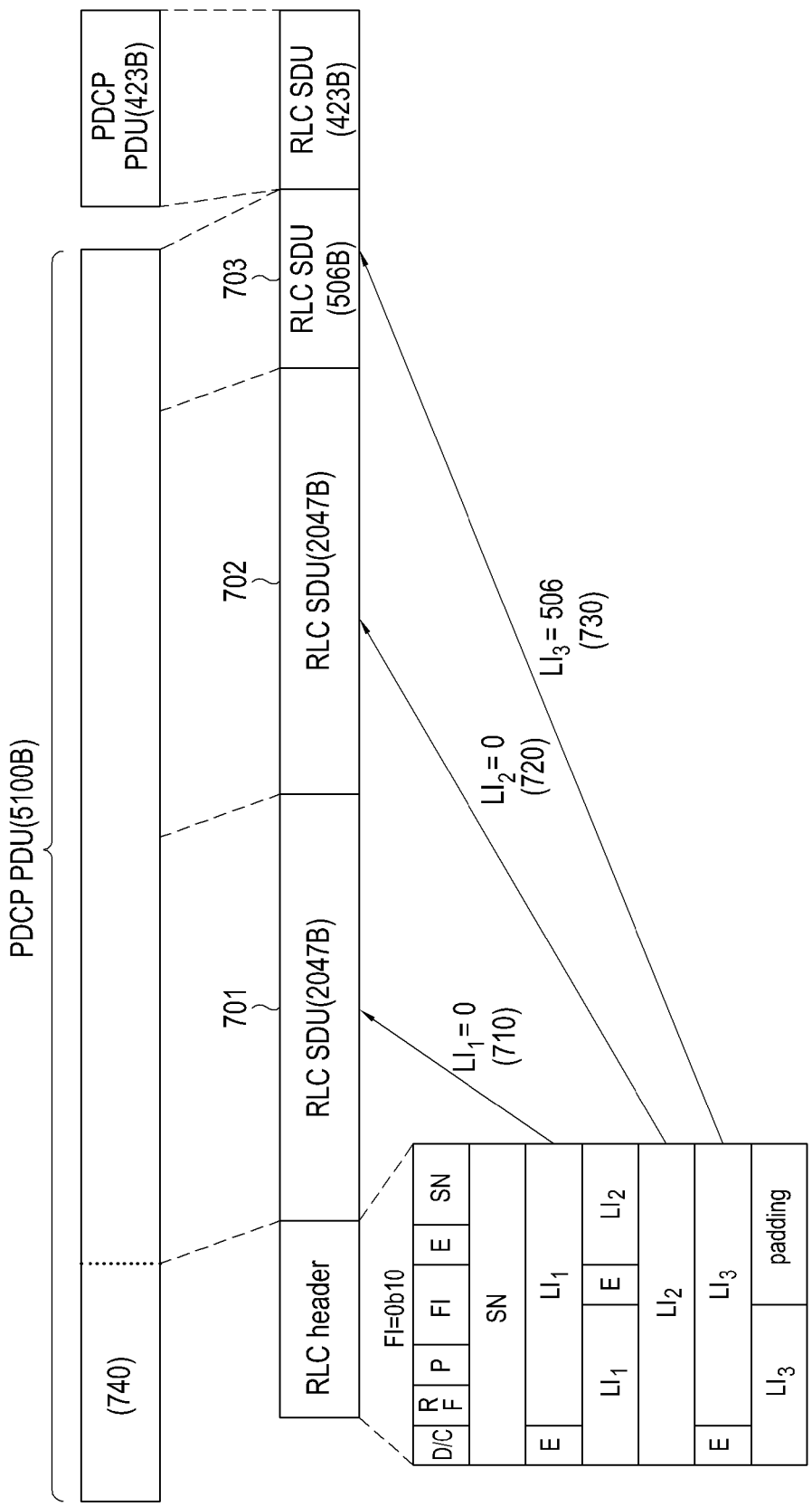
FIG. 7 illustrates a packet in an LTE system supporting a large SDU in a mobile communication system according to an embodiment of the present invention.

FIG. 7 illustrates a packet in an LTE system supporting a large SDU in a mobile communication system according to an embodiment of the present invention.

Referring to FIG. 7, reference numeral 740 shows that the front portion of the RLC SDU having a size greater than 2047 bytes has been fragmented and transmitted in the previous TTI. Here, it is assumed that 500 bytes have already been transmitted in the previous TTI. In order to express the remaining RLC SDU of 4600 bytes (i.e., 5100 bytes minus the previously transmitted 500 bytes), the LI fields of the RLC header are configured as $LI_1$=0 (710), $LI_2$=0 (720) and $LI_3$=506 (730), respectively. That is, for the RLC SDU 701 of 2047 bytes, the LI field of the RLC header is configured as $LI_1$=0 (710), for the RLC SDU 702 of 2047 bytes, the LI field of the RLC header is configured as $LI_2$=0 (720), and for the RLC SDU 703 of 506 bytes, the LI field of the RLC header is configured as $LI_3$=506 (730).

In addition to the configuration of the LI field, the FI field of the RLC header is expressed as "0b10" to indicate that the RLC SDU has been fragmented.

According to the embodiments of the present invention illustrated in FIGS. 6 and 7, as the maximum allowable length of the PDCP PDU increases, the bit number of the specification does not need to be changed, differently from the embodiment of the present invention illustrated in FIG. 5.

Figure 8:
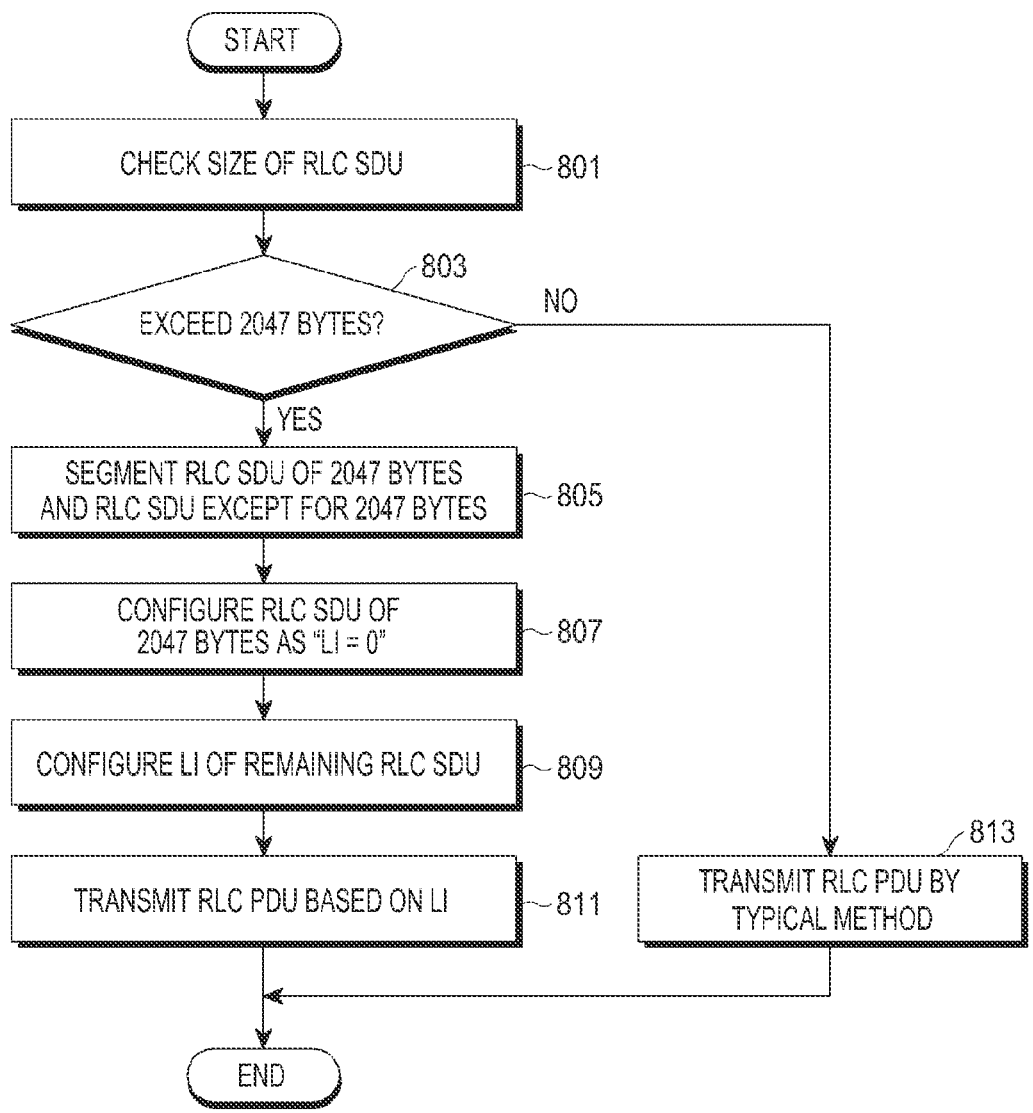
FIG. 8 is a flowchart illustrating an operation of a base station supporting a large SDU in a mobile communication system according to an embodiment of the present invention.

FIG. 8 is a flowchart illustrating an operation of a base station supporting a large SDU in a mobile communication system according to an embodiment of the present invention.

Referring to FIG. 8, the base station checks a size of an RLC SDU to be transmitted in step 801.

In step 803, the base station determines whether the size of the RLC SDU to be transmitted exceeds 2047 bytes. If the size of the RLC SDU to be transmitted does not exceed 2047 bytes, the base station transmits the RLC SDU by a typical method in step 803. However, if the size of the RLC SDU to be transmitted exceeds 2047 bytes, the base station segments the RLC SDUs by 2047 bytes intervals in step 805.

In step 807, the base station configures the LI field of the RLC header with respect to the RLC SDU of 2047 bytes to be "0", and in step 809, the base station configures the LI fields of the RLC header with respect to the RLC SDUs that are less than 2047 bytes as illustrated in FIGS. 5 to 7. For example, as illustrated in FIG. 5, the RLC SDU 502 of 2047 bytes is expressed as "$LI_2$=0" (510), and the RLC SDU 503 that is less than 2047 bytes is expressed as "$LI_3$=300" 520.

Similarly, as illustrated in FIG. 6, the RLC SDU of 1000 bytes, i.e., less than 2047 bytes, is expressed as "$LI_1$=1000" 600. Further, although the RLC SDU of 4632 bytes exceeds 2047 bits, it does not need the additional LI field because it is the last SDU of the RLC PDU.

Similarly, as illustrated in FIG. 7, the RLC SDUs 701 and 702 of 2047 bytes are expressed as "$LI_1$=0 (710)" and "$LI_2$=0 (720)", respectively, and the RLC SDU 703 of 506 bytes is expressed as "$LI_3$=506 (730)".

In step 811, the base station transmits the RLC PDU based on the configured LI fields.

Figure 9:
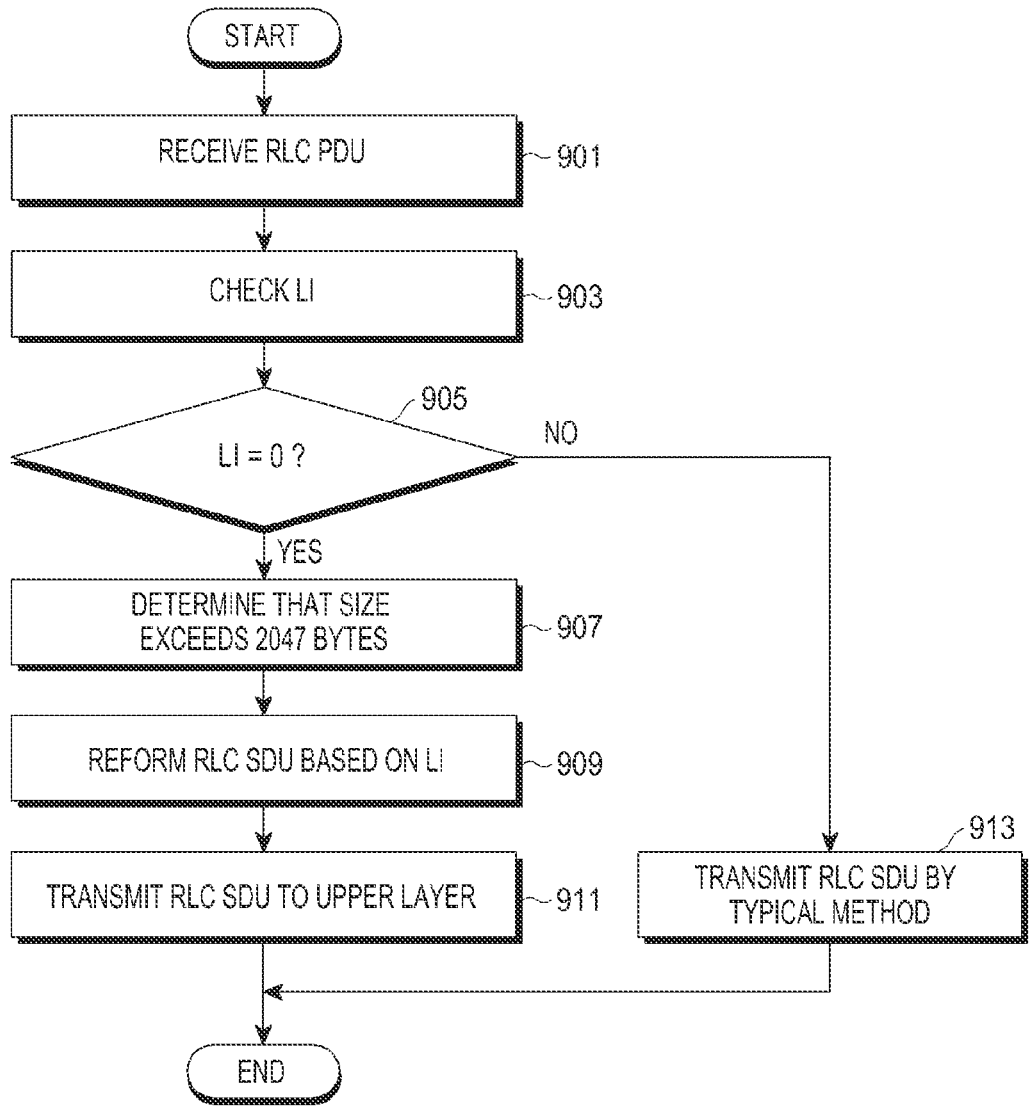
FIG. 9 is a flowchart illustrating an operation of a terminal supporting a large SDU in a mobile communication system according to an embodiment of the present invention.

FIG. 9 is a flowchart illustrating an operation of a terminal supporting a large SDU in a mobile communication system according to an embodiment of the present invention.

Referring to FIG. 9, the terminal receives the RLC PDU in step 901. The terminal checks the "LI=0" in the received RLC header in step 903. The terminal determines whether the "LI=0" in the RLC header exits in step 905. If the "LI=0" in the RLC header doesn't exit, the terminal reforms the RLC SDU by the typical method in step 913. However, if the "LI=0" of in the RLC header exits, the terminal determines that the size of the SDU exceeds 2047 bytes in step 907.

In step 909, the terminal reforms the RLC SDU based on the confirmed LI, and in step 911, the terminal transmits the RLC SDU to the upper layer.

Figure 10:
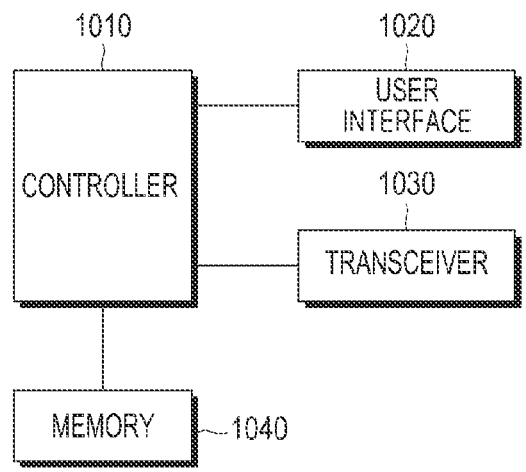
FIG. 10 is a block diagram illustrating a terminal supporting a large SDU in a mobile communication system according to an embodiment of the present invention.

FIG. 10 is a block diagram illustrating a terminal supporting a large SDU in a mobile communication system according to an embodiment of the present invention.

Referring to FIG. 10, the terminal includes a transceiver 1030, a controller 1010, a memory 1040, and a user interface 1020, e.g., a display, a speaker, a keypad, and/or a touch screen.

The transceiver 1030 transmits and receives data to and from, respectively, a base station in the mobile communication system. In addition, the transceiver 1030 receives an RLC PDU from the base station.

The controller 1010 checks the LI of the RLC header with respect to the RLC PDU and determines whether the LI of the RLC header is "0". If the LI of the RLC header is "0", the controller 1010 determines that the size of the SDU exceeds 2047 bytes, and reforms the RLC SDU, based on the confirmed LI.

The user interface 1020 transmits information corresponding to a user input to the controller 1010 or provides, e.g., displays, information to the user under the control of the controller 1010.

Figure 11:
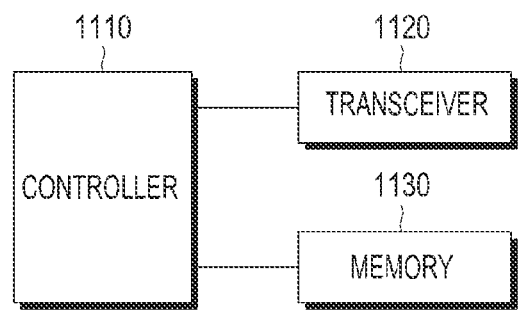
FIG. 11 is a block diagram illustrating a base station supporting a large SDU in a mobile communication system according to an embodiment of the present invention.

FIG. 11 is a block diagram illustrating a base station supporting a large SDU in a mobile communication system according to an embodiment of the present invention.

Referring to FIG. 11, the base station includes a transceiver 1120, a memory 1130, and a controller 1110.

The transceiver 1120 transmits and receives data to and from, respectively, the terminal in the mobile communication system. That is, the transceiver 1120 transmits the RLC PDU to the terminal based on the LI.

The memory 1130 stores or retrieves various data for supporting the large SDU in the mobile communication system.

The controller 1110 determines whether the size of the RLC SDU to be transmitted in the mobile communication system exceeds 2047 bytes. If the size exceeds 2047 bytes, the controller 1110 segments the RLC SDU by 2047 bytes, configures the SDU of 2047 bytes as "LI=0", and configures LIs of the remaining SDUs as the size corresponding to the remaining SDUs.

Further, the method and apparatus for supporting a large SDU in a mobile communication system according to an embodiment of the present disclosure may be implemented in the form of hardware, software, or a combination thereof. Any such software may be stored, for example, in a volatile or non-volatile storage device such as a Read Only Memory (ROM), a memory such as a Random Access Memory (RAM), a memory chip, a memory device, or a memory IC, or a recordable optical or magnetic medium such as a Compact Disc (CD), a Digital Versatile Disc (DVD), a magnetic disk, or a magnetic tape, regardless of its ability to be erased or its ability to be re-recorded. It may also be appreciated that the method for supporting a large SDU in a mobile communication system according to an embodiment of the present invention may be implemented by a computer or a mobile terminal including a controller and a memory, and the memory is an example of a machine-readable storage medium suitable for storing a program including instructions that implement embodiments of the present invention.

Accordingly, the present invention includes a program including a code for implementing the apparatus and method described in the appended claims of the specification and a machine (computer or the like)-readable storage medium for storing the program. Further, the program may be electronically transferred by a predetermined medium such as a communication signal transferred through a wired or wireless connection, and the present disclosure appropriately includes equivalents of the program.

In addition, the apparatus for supporting the large SDU in the mobile communication system according to an embodiment of the present invention may receive and store programs from a program providing apparatus that is connected by wireless or wired communication. The program providing apparatus may include programs including instructions by which the program processing apparatus executes the method for supporting the large SDU in the predetermined mobile communication system, a memory for storing information necessary for the method for supporting the large SDU in the mobile communication system, a communication unit for making wireless or wired communication with a graphic processing device, and a controller that transmits the corresponding program to a transmitting/receiving device by the request of the graphic processing device or automatically.

As described above, certain embodiments of the present invention support a large SDU in a mobile communication system, wherein although the length of a header increases by N×12 bits with the increase in the number N of large RLC SDUs, additional signaling in the upper layer is not required to be compatible with the typical LTE protocol stack.

While the present invention has been shown and described with reference to certain embodiments thereof, it will be understood by those skilled in the art that various changes in form and details may be made therein without departing from the scope of the present invention. Therefore, the scope of the present invention should not be defined as being limited to the embodiments described herein, but should be defined by the appended claims and any equivalents thereof.

What is claimed is:

1. A method for supporting a large Service Data Unit (SDU) in a receiver of a mobile communication system, the method comprising:
   receiving a Radio Link Control (RLC) Protocol Data Unit (PDU) from an upper layer;
   checking a Length Indicator (LI) included in an RLC header of the RLC PDU;
   if the LI is configured as a reserved value, determining that the received RLC PDU includes an RLC SDU of 2047 bytes;
   if the LI is configured as a value other than the reserved value, determining that the received RLC PDU includes an RLC SDU of a size corresponding to the value of the LI; and
   reforming the RLC SDU, based on the LI.

2. The method of claim 1, wherein the LI is a field that is configured in the RLC header.

3. The method of claim 1, wherein the LI is omitted, for a last RLC SDU of a plurality of RLC SDUs.

4. The method of claim 1, wherein the LI is omitted, when only one RLC SDU is to be transmitted.

5. The method of claim 1, wherein a Framing Information (FI) field of the RLC header indicates that an RLC SDU is fragmented.

6. A method for supporting a large Service Data Unit (SDU) in a transmitter of a mobile communication system, the method comprising:
 determining whether a size of a Radio Link Control (RLC) SDU to be transmitted exceeds 2047 bytes;
 if the size of the RLC SDU exceeds 2047 bytes, segmenting the RLC SDU by 2047 bytes;
 configuring a Length Indicator (LI) of the RLC SDU of 2047 bytes as a reserved Value;
 configuring an LI of a remaining RLC SDU as a value corresponding to a size of the remaining RLC SDU; and
 transmitting an RLC Protocol Data Unit (PDU), based on the configured LIs.

7. The method of claim 6, wherein the LI is a field that is configured in the RLC header.

8. The method of claim 6, wherein the LI is omitted, for a last RLC SDU of a plurality of RLC SDUs.

9. The method of claim 6, wherein the LI is omitted, when only one RLC SDU is to be transmitted.

10. The method of claim 6, wherein a Framing Information (FI) field of the RLC header indicates that an RLC SDU is fragmented.

11. An apparatus for supporting a large Service Data Unit (SDU) in a receiver of a mobile communication system, the apparatus comprising:
 a transceiver that receives a Radio Link Control (RLC) Protocol Data Unit (PDU) from an upper layer; and
 a controller that:
  checks a size of a Length Indicator (LI) included in an RLC header of the RLC PDU,
  if the LI is configured as a reserved value, determines that the received RLC PDU is an RLC SDU of 2047 bytes,
  if the LI is configured as a value other than the reserved value, determines that the received RLC PDU includes an RLC SDU of a size corresponding to the value of the LI, and
  reforms the RLC SDU, based on the LI.

12. The apparatus of claim 11, wherein the LI is a field that is configured in the RLC header.

13. The apparatus of claim 11, wherein the LI is omitted, for a last RLC SDU of a plurality of RLC SDUs.

14. The apparatus of claim 11, wherein the LI is omitted, when only one RLC SDU is to be transmitted.

15. The apparatus of claim 11, wherein a Framing Information (FI) field of the RLC header indicates that an RLC SDU is fragmented.

16. An apparatus for supporting a large Service Data Unit (SDU) in a transmitter of a mobile communication system, the apparatus comprising:
 a controller that:
  determines whether a size of a Radio Link Control (RLC) SDU to be transmitted exceeds 2047 bytes,
  segments the RLC SDU by 2047 bytes, if the size of the RLC SDU exceeds 2047 bytes,
  configures a Length Indicator (LI) of the RLC SDU of 2047 bytes as a reserved value, and
  configures an LI of a remaining RLC SDU as a value corresponding to a size of the remaining RLC SDU; and
 a transceiver that transmits an RLC Protocol Data Unit (PDU), based on the configured LIs.

17. The apparatus of claim 16, wherein the LI is a field that is configured in the RLC header.

18. The apparatus of claim 16, wherein the LI is omitted, for a last RLC SDU of a plurality of RLC SDUs.

19. The apparatus of claim 16, wherein the LI is omitted, when only one RLC SDU is to be transmitted.

20. The apparatus of claim 16, wherein a Framing Information (FI) field of the RLC header indicates that an RLC SDU is fragmented.

21. A method for manufacturing an apparatus which supports a large Service Data Unit (SDU) in a receiver of a mobile communication system, comprising:
 manufacturing a transceiver that receives a Radio Link Control (RLC) Protocol Data Unit (PDU) from an upper layer; and
 manufacturing a controller that:
  checks a size of a Length Indicator (LI) included in an RLC header of the RLC PDU,
  if the LI is configured as a reserved value, determines that the received RLC PDU is an RLC SDU of 2047 bytes,
  if the LI is configured as a value other than the reserved value, determines that the received RLC PDU includes an RLC SDU of a size corresponding to the value of the LI, and
  reforms the RLC SDU, based on the LI.

22. A method for testing an apparatus which supports a large Service Data Unit (SDU) in a receiver of a mobile communication system, comprising:
 testing whether the apparatus checks a Length Indicator (LI) included in an RLC header of the RLC PDU;
 testing whether, if the LI is configured as a reserved value, the apparatus determines that the received RLC PDU includes an RLC SDU of 2047 bytes;
 testing whether, if the LI is configured as a value other than the reserved value, the apparatus determines that the received RLC PDU includes an RLC SDU of a size corresponding to the value of the LI; and
 testing whether the apparatus reforms the RLC SDU based on the determined LI.

\* \* \* \* \*